March 4, 1924.

U. BISCHOF

BOOK FASTENING MACHINE

Filed June 1, 1922      9 Sheets-Sheet 1

INVENTOR
U. Bischof
BY Marks & Clerk
ATTYS.

March 4, 1924.

U. BISCHOF

BOOK FASTENING MACHINE

Filed June 1, 1922

INVENTOR
U. Bischof
BY Marks Clerk
ATTYS.

March 4, 1924.

U. BISCHOF 1,485,905

BOOK FASTENING MACHINE

Filed June 1, 1922   9 Sheets-Sheet 8

INVENTOR
U. Bischof,
BY Marks & Clerk
ATTYS.

Patented Mar. 4, 1924.

1,485,905

UNITED STATES PATENT OFFICE.

ULRICH BISCHOF, OF HORGEN, SWITZERLAND, ASSIGNOR TO THE FIRM GEBR. STÄUBLI & CO., OF HORGEN, SWITZERLAND.

BOOK-FASTENING MACHINE.

Application filed June 1, 1922. Serial No. 565,278.

*To all whom it may concern:*

Be it known that I, ULRICH BISCHOF, a citizen of the Republic of Switzerland, residing at Horgen, in the Canton of Zurich, Republic of Switzerland, have invented certain new and useful Improvements in Book-Fastening Machines, of which the following is a specification.

It has been found that the fastening of books can be made more solid, when each of the sheets to be fastened by means of threads or wires is provided with paste before the fastening, for the purpose, that when the book is finished, the sheets are connected together by the threads or wires as well as by the paste.

The accompanying drawings illustrate by way of example an embodiment of the improved laying-on apparatus in combination with a machine for fastening the sheets together by means of thread.

Figs. 7 to 12 show details of the laying-on apparatus, that is.

Figure 1:
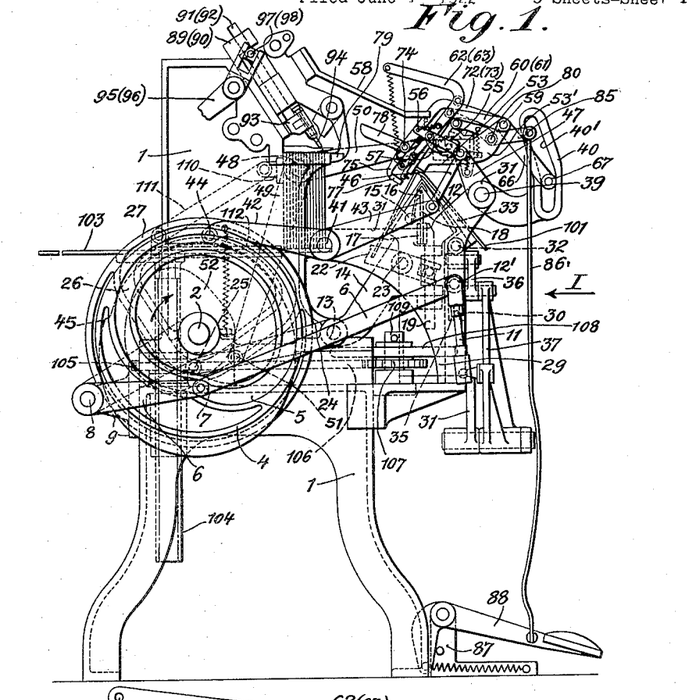
Fig. 1 is a side elevation thereof taken in the direction of the arrow II in Fig. 2.
Figure 2:
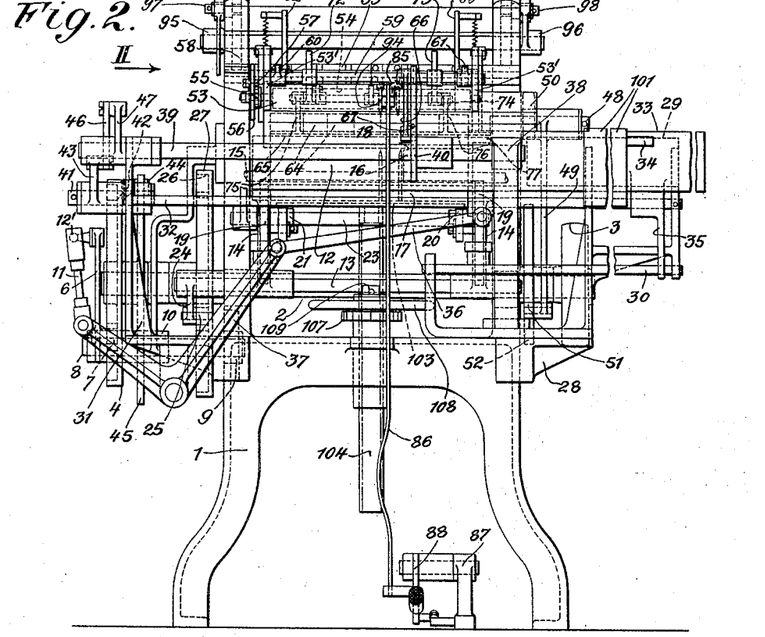
Fig. 2 is a front elevation looking in the direction of the arrow I in Fig. 1.

Referring to the Figs. 1 and 2, 1 is the machine frame, 2 is the driving shaft mounted in the frame, 3 is the driving pulley, and 4 a cam having a curved groove 5, in which engages an anti-friction roller 7 carried by the rocking lever 6. The shaft 8 on which is fixed the rocking lever 6, rests in bearings 9, 10 of the frame. The lever 6 carries at its free end a universal joint 12′ engaging a bar 11; the purpose of which is described herein-after. On a shaft 13 mounted in the machine frame 2 is fixed by means of arms 14 the machine table 12 serving to receive the sheets to be fastened. In the table 12 is mounted also the rod 15 together with the thread layer for forming the knot, and a bar 17 carrying the piercing needles 18 of which only two are represented in the figures. The bar 17 is fixed on bolts 19 slidable in bearings of the table 12; the means for moving the bar 15 to and fro are well known and not represented especially. The up- and down motion of the bar 17 is effected by levers 20, 21 and 22 fixed on the shaft 23. This shaft is mounted in the table 12 and makes oscillatory movements from time to time. On the shaft 13 is fixed an arm 24 having an antifriction roller 25 engaging a curved groove 26 of a disc 27 on the shaft 2. When the shaft 2 and the disc 27 rotate, the curved groove 26 and the arm 24 cause the swinging movement of the table 12.

Figure 3:
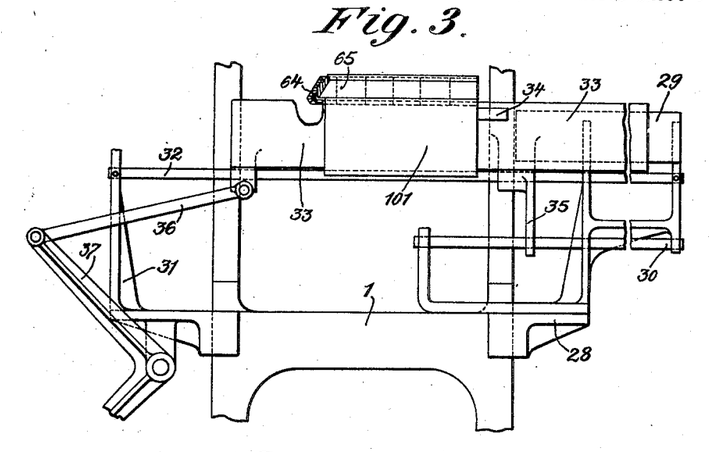
Fig. 3 is an enlarged side elevational detail.
Figure 4:
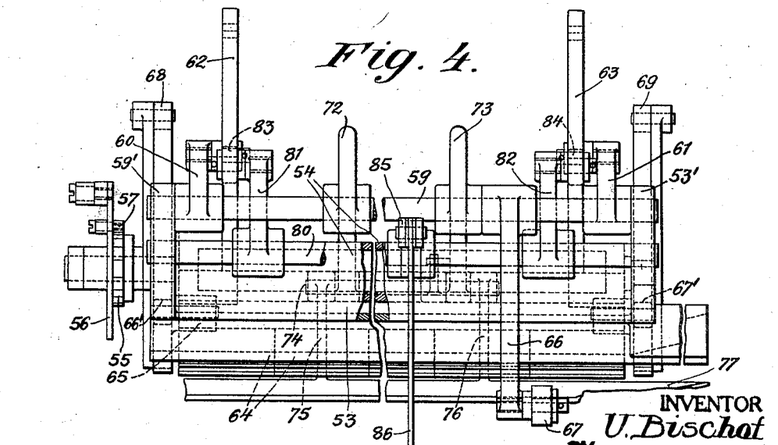
Figs. 4, 5 and 6 represent the laying-on apparatus in a front elevation, a side elevation and a plan view.

On the machine frame 1 is arranged by means of a bracket 28 an auxiliary table 29 having the same shape as the table 12 (Figs. 1 to 3). In this auxiliary table is mounted a rod 30. In the bracket 28 as well as in the bracket 31 fixed to the other end of the machine frame is mounted a rod 32 on which moves a slide block 33 having an abutment 34. This slide block has a downwardly directed guide arm 35 engaging over the rod 30 (Figs. 2 and 3). On the slide block 33 is pivoted one end of a bar 36, the other end of which is connected with an arm of a fulcrumed lever 37 pivoted on the racket 31, the other arm of the lever 37 is pivoted on the bar 11 hereinbefore referred to. From the foregoing it will be understood, that the oscillations of the lever 6 will cause through the medium of the bar 11, the lever 37 and the bar 36, the slide block 33 to move to and fro.

Figure 5:
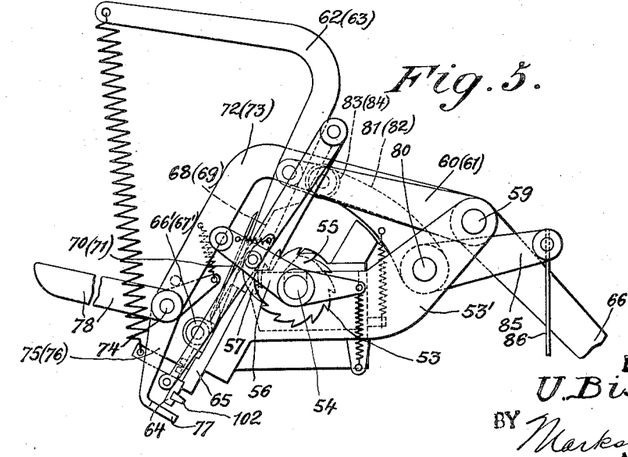
Figure 6:
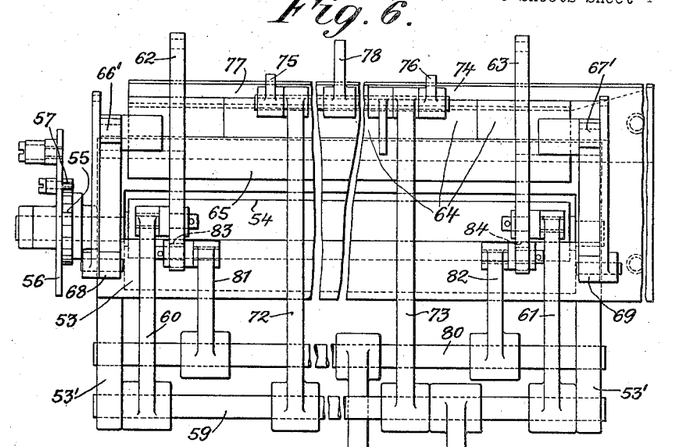
Figure 19:
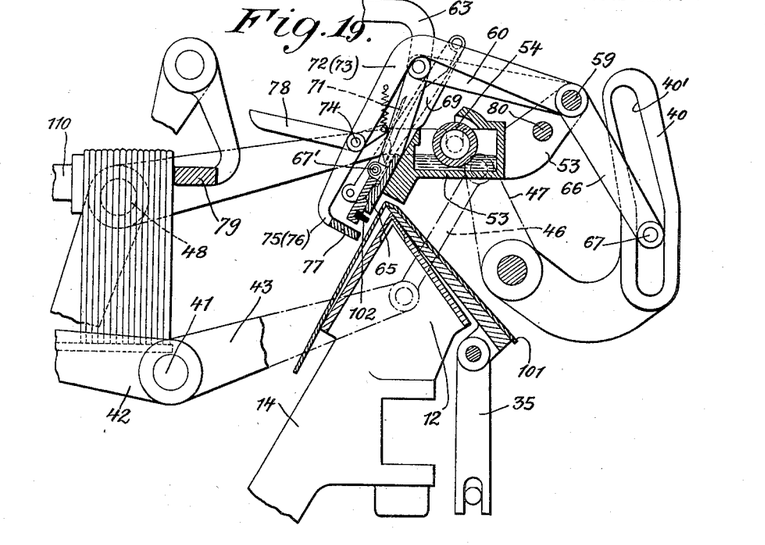
Figs. 19 to 24 inclusive are enlarged fragmentary side elevational details of the laying on apparatus per se in positions corresponding respectively to the positions shown in Figs. 13 to 18.

In the bracket 31, and in the bracket 38 fixed on the other end of the frame, is mounted a shaft 39 on which is fixed a lever 40 having a curved slot 40′; (Figs. 1, 2 and 19) the purpose of this slot is described hereinafter. On the upper end of the bracket 31 is fixed a trunnion 41, for the bent lever 42, 43, the arm 42 of which carries an antifriction roller 44 running on the curved outside of the cam 45, whereas the arm 43 is connected by a link 46 with an arm 47 mounted on the shaft 39. It is obvious that the rotation of the cam 45 will cause through the medium of the elements 44, 42, 43, 46, 47 oscillating motions of the lever 40. Another bent lever 49, 50 is loosely mounted on a trunnion 48 fixed on the frame; the arm 49 carries an antifriction roller 51 running on cam 52 fixed on shaft 2. A wide trough 53 for the liquid paste is mounted on the arm 50 of said bent lever; the oscillations of the arm 49 imparted to it by the cam 52 cause up-and-down movements of the trough. (Figs. 1, 2, 4–6 and 19) 54 is a roller mounted in the sides of the trough, on said roller is also mounted a ratchet wheel 55 in which engages a pawl 57 pivoted on the lever 56. 58 is a stop fixed on the frame of the needle apparatus, (Fig. 1). Each time the lever is raised, the lever 56 strikes against the stop 58 and turns the ratchet wheel 55 and the roller 59 for a distance between two teeth. A shaft 54 is mounted in bearings 53' of the trough 53 and carries two arms 60 and 61; these arms are respectively connected by links 62 and 63 with a plate 65. 64 are stickers fixed closely side by side on the plate 65 (Figs. 1, 5 and 19). A lever 66 is fixed on shaft 59, the free end of which carries an anti-friction roller 67 engaging in the curved slot 40' of the lever 40; it is obvious that the up-and-down movements of the lever 40 cause also an up-and-down movement of the plate 65. 66' 67' are rollers mounted at the sides of the plate 65; each of said rollers runs over a curved bar 68, 69 fixed on the trough. (Figs. 11, 12, 6–10 and 19.) Spring plates 70, 71 are respectively fixed on each curved bar.

Two arms 72 and 73 carrying the shaft 74 are fixed on the shaft 59. 75 and 76 are two arms mounted on shaft 74 and connected with another by a bar 77. As described hereinafter the bar 77 serves for guiding the sheets to be provided with paste. On shaft 74 is also mounted a lever 78 reaching in the path of the lever 79. (Figs. 13–19); the lever 79 when striking against lever 78 raises it and turns at the same time the levers 75 and 76 with the bar 77. 89 and 90 are the supports for the well known needle apparatus, 91 and 92 are sliding rods on which is mounted the bar 93 with the needles 94 (Figs. 1 and 2). On a shaft mounted in the frame 1 are fixed the two armed levers 95 and 96 having forked ends engaging blocks pivoted at 97, 98 to the needle bar. The shaft receives from time to time by known means not forming part of this invention, a rotary motion, whereby there is imparted to the needle bar an up-and-down motion by means of which the needles are caused to pierce the sheet laid on the table saddle 12.

The book table 103 rests on a screw spindle 104 guided in the frame and carries a screw nut 105 having the shape of a chain wheel. The spindle is connected by a chain 106 to a chain wheel 107 which together with the hand wheel 108 is located loose on the bolt 109 fixed in the frame. By suitably rotating the hand wheel, the book table can be adjusted in the vertical direction. The support for the fastened sheets is constituted by an angle-shaped member 110, which is jointed by means of a link 111 to a slide block 112 that is in its turn guided in the book table 103.

The operation of the machine is as follows:—

Figures 7, 8, 9, 10, 25:
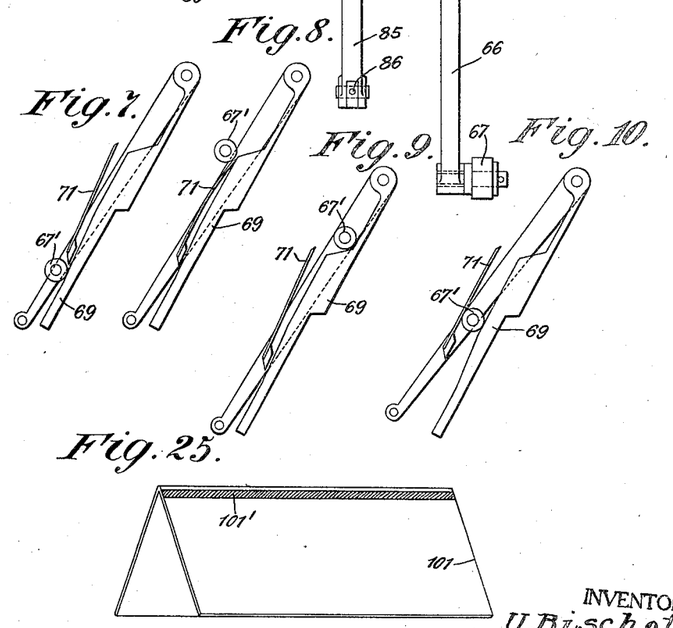
Figs. 7 to 10 a controlling mechanism, in various positions, and Figs. 11 and 12 the plate with the stickers.
Fig. 25 represents a sheet provided with paste.
Figures 11, 12:
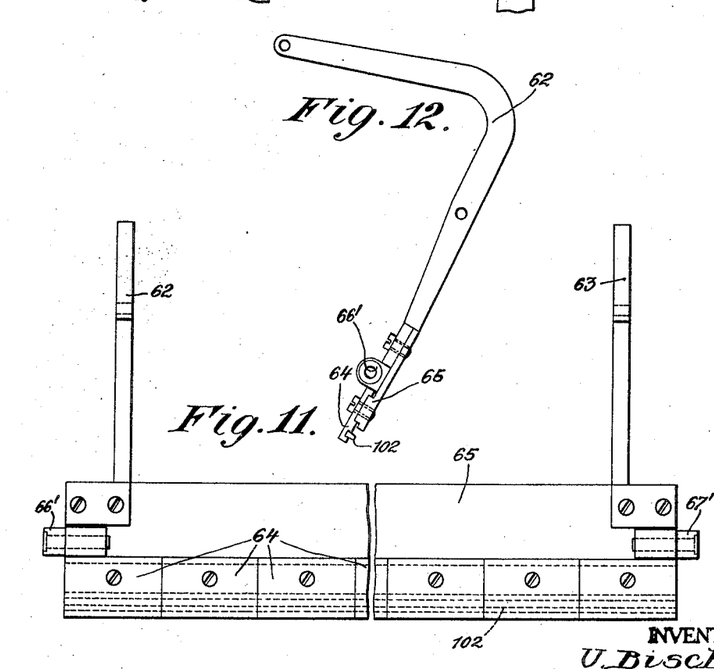
Figures 13, 14:
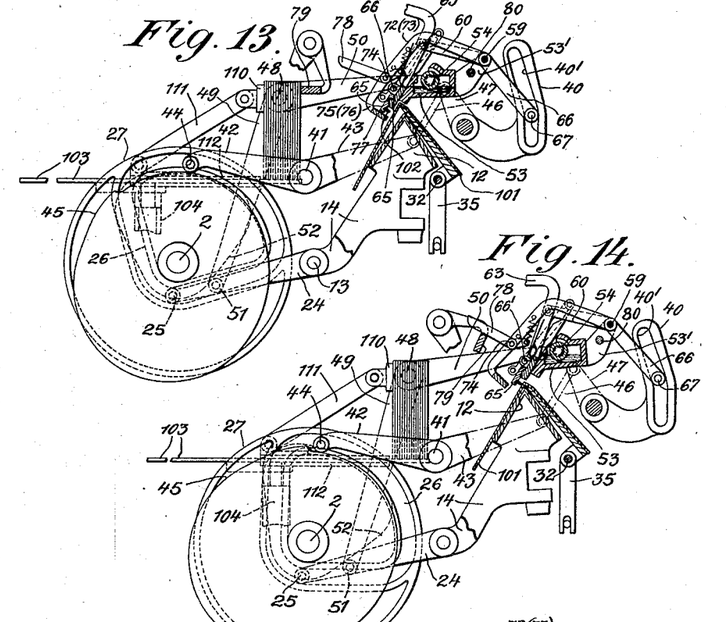
Figs. 13 to 18 show the laying-on apparatus in various positions.
Figure 15:
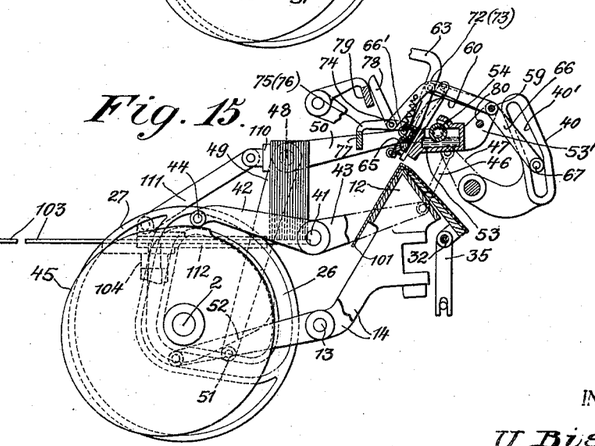
Figures 16, 17, 18:
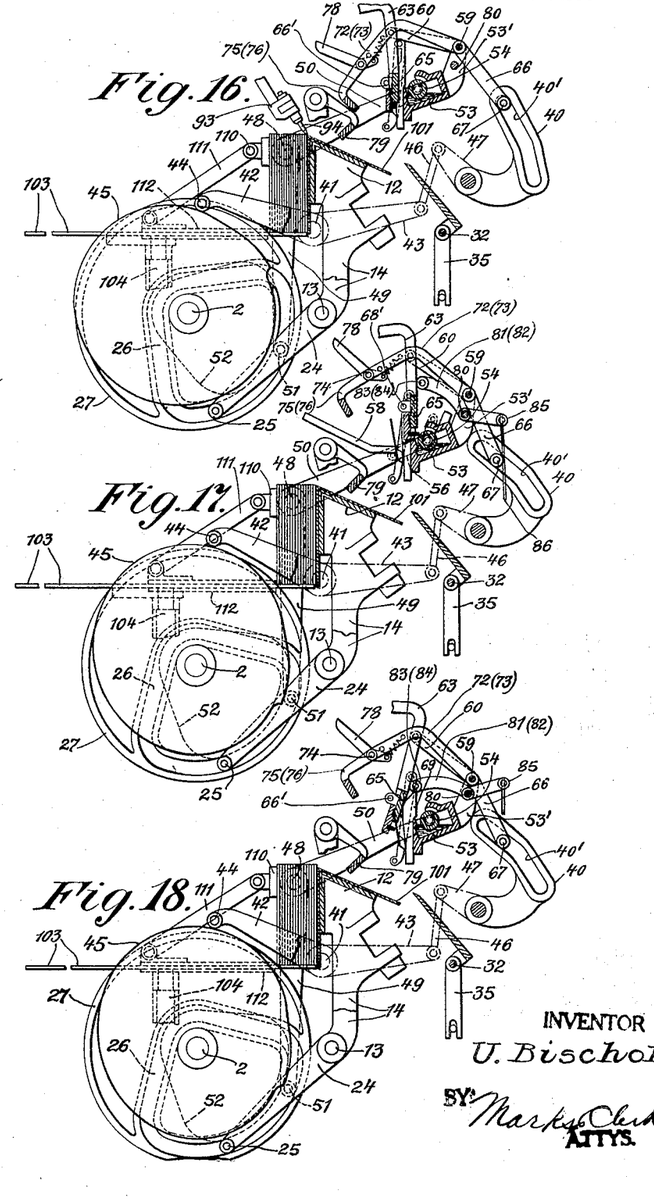
Figure 20:
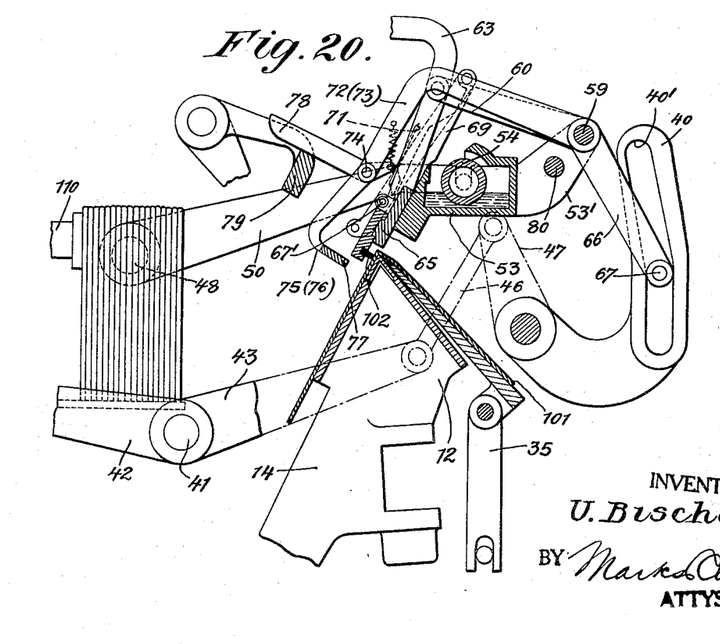
Figure 21:
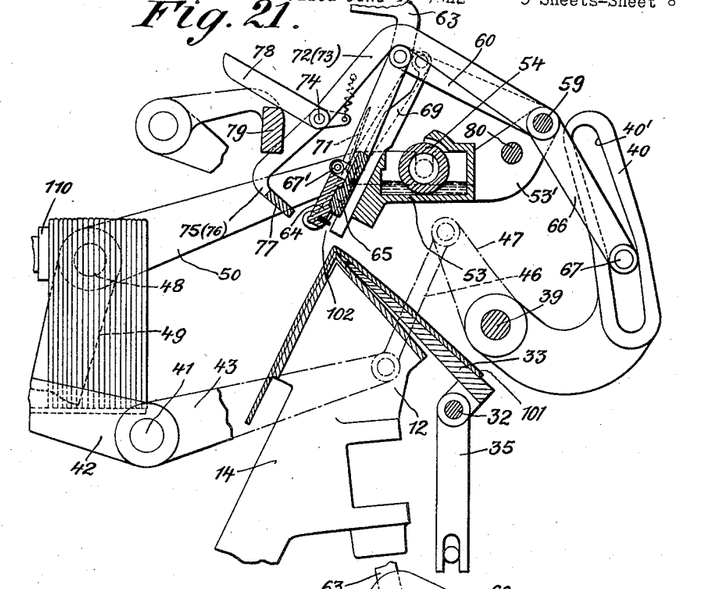
Figure 22:
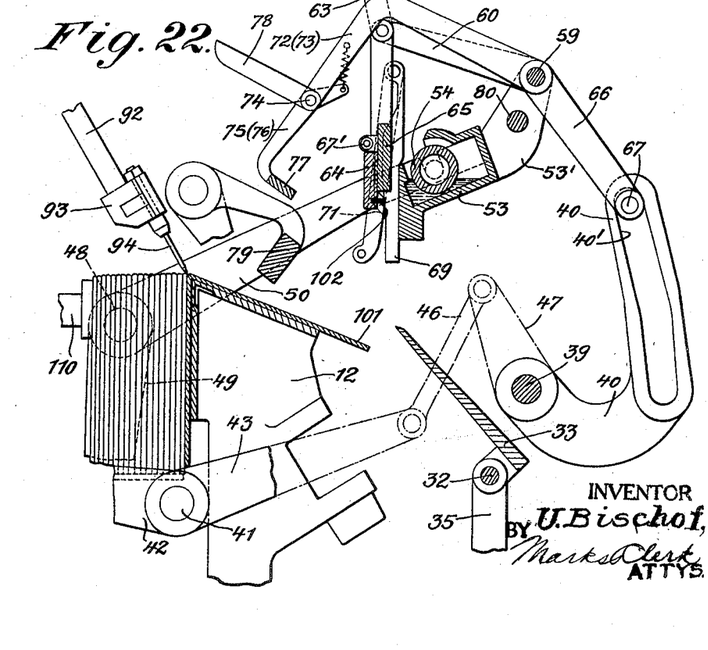

It may be supposed, a sheet 101 has been laid on the slide block 33 by the operative in such a manner that the right hand edge of the sheet lies on the left hand edge of the abutment 34. (Fig. 2), the table 12 is in the outermost position shown in Figs. 1, 2 and 19, and the trough is in the lowermost position shown in Figs. 13 and 19. The rotation of the cam 4 in the direction of the arrow indicated in Fig. 1 will cause the levers 6, 37 and the bars 11, 36, to move the slide block 33 to the left, with the effect, that the abutment 34 moves the sheet 101 on the table 12. It will be seen from the Figs. 3, 13 and 19 that during said movement the sheet is guided by the lower part of the plate 65 and the trough 53. Now the cam 52 acts on arm 49 of the bent lever 49, 50 and raises the trough 53 a little, that is, in the position shown in Figs. 14 and 20. Meanwhile under the influence of the cam 27 and the lever 24 the table 12 has been moved inwardly and the sheet 101 resting on the table makes contact with the blocks 102 of rubber fixed on the stickers 64 of the plate 65. In such a manner the sheet 101 is provided below the guard with a narrow layer of paste 101' (Fig. 25). Now the cam 45 acts on the lever 42, 43 and causes the raising of the plate 65 with the stickers 64 through the medium of the levers 46, 47, 40, 66, 60, 61 and the links 62, 63. During this movement of the plate the rollers 66', 67' run on the inclined surfaces of the spring plates 70, 71 and turn the plate 65 a little inwardly, with the result, that space is opened for enabling the table 12 to swing in the innermost position, in which the sheet 101 lies under the needles 94 and is ready for fastening (Figs. 16 and 22). The bar 77 serves for retaining the sheet 101 on the table 12 when the sheet is moved on the table by the slide block 33, and prevents the application of paste at undesirable places on the sheet. (Figs. 13 and 19.) When the sheet is entered in the correct position on table 12, the lever 79 strikes against lever 78 which in turn raises the bar 77 from the sheet. When the trough 53 is entered in the uppermost position (Figs. 17 and 23) the plate 65 has also reached the uppermost position, by the action of the cam 45 and the parts 42, 43, 46, 47, 40, 66, 60, 61, 62 and 63; in this position the blocks 102 fixed on the stickers 64 strike against the roller 54 covered with paste so that they are charged with it. Because the arms 72, 73 carrying the bar 77, as well as the arms 61 causing the raising and lowering of the bar 65, are fixed on the shaft 59, the bar 77 enters also in the uppermost position when said bar 65 is raised. During this movement the lever 78 releases the lever 79.

When the table 12 carrying the sheet has finished the inward motion, the slide block moves to the right under the influence of the parts 4, 6, 37, 11 and 36, meanwhile the sheets are fastened together. For this purpose the needles 18 fixed on the bar 17 are caused by the levers 20, 21, 22 to move upwards and perforate the sheet and then return quickly. (Figs. 1 and 2.) Immediately thereupon the levers 95, 96 are turned by a cam (not shown) for lowering the bars 91, 92 and causing the needles 94 to move throughout the holes made by the needles 18 in the sheet. When the needles 94 have reached the lowermost position, the layer 16 causes in a well known manner the knotting of the thread.

When the knotting is finished, the curved groove 26 of the cam 27 causes by means of the arms 24 and 14 the outward motion of the table 12 for receiving a fresh sheet. Meanwhile the lever 78 when moving down causes the forepart of the sheet to turn downward and thereupon the whole sheet is pushed backwards on the pile of fastened sheets resting on the table 103 (see Figs. 13 and 19). Meanwhile the table 12 has reached the outmost position, (see the same figures) the trough 53 has been moved by the cam 52 in the position shown in said figures, and also the plate 65 with the stickers 64 and bar 77 have been moved in the position represented in the same figures.

Figure 23:
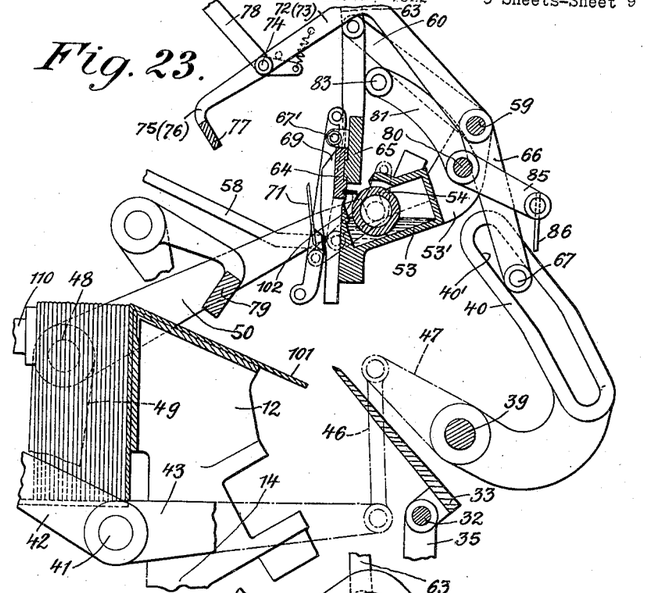

Each time that the trough 53 is raised, the ratchet lever 56 fixed on roller 54 strikes against the stop 58 (Figs. 1 and 5) and the pawl 57 pivoted on lever 56 turns the roller for the distance between two teeth of the ratchet wheel. By this arrangement is attained, that the blocks 102 at each stroke of the machine strike against a fresh point of the roller 54 covered with paste so that they are certainly charged with it. (Figs. 17 and 23.)

As it is mentioned heretofore, the plate 65 without the upward motion makes also an inward directed motion under the influence of the rollers 66' 67' running on the spring plates 70, 71 of the curved bars 68, 69.

When the plate 65 raises, the rollers 66' and 67' run on the steep rising parts of the bars 68, 69 (Fig. 7) with the result, that the plate 65 with stickers 64, are quickly removed from the table 12 when the blocks 102 have made contact with the sheet. During the upward movement of the plate 65 the rollers 67' run over the flat springs 70, 71; the crossing of the rollers from the springs to the bars is enabled by the inflection of said springs (Fig. 8). When the plate 65 reaches the uppermost position, the rollers 67' abandon the flat springs and cross on the upper sloping parts of the bars (Fig. 9), meanwhile the flat springs return in the straight position. When the rollers 67' run on the sloping parts of the bars, the plate 65 with the blocks 102 is pressed against the roller 54 covered with paste and the blocks 102 are charged with paste. Now the plate 65 begins the down movement; during this movement the rollers 67' run on the underside of the flat springs 70, 71 and cause the raising of them (Fig. 10). During the quick downward movement of the plate 65 the rollers run noiselessly on a slightly inclined path. This result would not be attained if the rollers should run on the abruptly inclined path as during the upward movement. When the plate 65 has again arrived at its lowermost position, the bars 69 automatically assume the position shown in Fig. 7.

It may be desired, that several of the sheets to be fastened shall not be provided with paste. To render it possible the following arrangement has been made.

Figure 24:
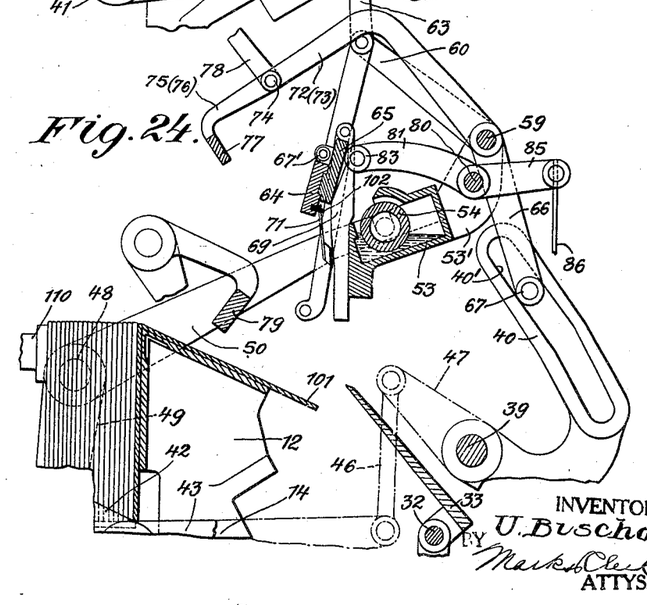

On the shaft 80 mounted in the bearings 53' of the trough 53 are mounted two levers 81, 82 having antifriction rollers 83, 84. On the shaft 80 is also mounted an arm 85, the free end of which is connected by a wire-rope 86 with a treadle 88 pivoted on a support 87. (Figs. 1, 5 and 23.) When the operative presses down the lever 88 with his foot, at the next up motion of the trough the wire rope 86 is stretched and it moves the levers 81, 82 in the position shown in Figs. 17 and 23. In this position said levers permit the blocks 102 fixed on the plate 65 to lie on the roller 54 and therefore the charging of it with paste. When the operative releases the treadle 88, the levers 81, 82 turn in the position shown in Figs. 18 and 24 in which the blocks 102 fixed on the plate 65 are held out of contact with the roller 54 by said rollers 83, 84 and cannot take up paste from it. It will be observed from the foregoing that the operative is enabled to provide each of the sheets to be fastened with paste or not; and it is unnecessary to stop the machine as it has been the case in the past to apply paste. The output of the machine is much greater than that of the manual labour in the same time.

The stickers 64 can be exchanged for others, for adjusting them according to the size of the sheets.

What I claim is:

1. In a book fastening machine the combination of a movable table upon which a sheet to be fastened is to be laid, a trough for receiving liquid paste, means for moving the trough towards the table and returning the same from the table, and means for automatically removing paste from said trough and laying it stripewise on the sheet to be fastened.

2. In a book fastening machine the combination of a movable table for the sheet to be fastened, a trough for receiving liquid paste, and means for moving the trough towards the table, consisting in a shaft lodged in the frame, a cam fixed on said shaft and a bent lever pivoted on the frame, one arm of said lever supporting the trough, and the other being actuated by the cam.

3. In a book fastening machine the combination of a movable table for the sheet to be fastened, a trough for receiving liquid paste, a roller lodged in two opposite sides of the trough, a movable plate, stickers fixed on the plate, means for moving the trough towards the table and means for moving the plate against the roller, for the purpose of removing paste from the trough and laying it on the sheet laid on the table.

4. In a book fastening machine the combination of a table for the sheet to be fastened, a needle apparatus for fastening the sheets, means for moving the table towards the needle apparatus, and removing it after the fastening, a trough for receiving liquid paste, a roller lodged in two opposite sides of the trough for dipping in the paste, a movable plate, stickers on this plate, means for moving the plate and the stickers intermittently against the roller, and in the path of the table, and means for turning the roller intermittently for the purpose that the stickers are charged with paste from the trough and thereupon lay it stripewise on the sheet resting on the table, and at each stroke of the table a fresh point of the roller is presented to the stickers.

5. In a book fastening machine the combination of a trough for receiving liquid paste, a roller lodged in two opposite sides of the trough, for receiving liquid paste, a plate having stickers, a shaft mounted in the frame, a cam fixed on this shaft, a lever actuated by the cam, and intermediate elements between that lever and the plate for transmitting motion from the cam to the plate, the arrangement being such that when the plate is in the raised position, the stickers are in contact with the roller, and when the plate is in the lowermost position the stickers are in the path of the table.

6. In a book fastening machine the combination of trough for receiving liquid paste, a roller lodged in opposite sides of the trough for receiving liquid paste, a ratchet wheel fixed on the roller, a rocking lever loosely mounted on the roller, a pawl pivoted on the rocking lever, and engaging in the ratchet wheel, and an abutment fixed on the frame and acting only on the rocking lever when the trough is raised.

7. In a book fastening machine the combination of a movable table for the sheet to be fastened, a trough for receiving liquid paste, a movable plate, means for moving the plate in the path of the table, bars fixed on the trough and having inclined surfaces, and rollers mounted at the sides of said plate, the rollers resting on the inclined surfaces, for the purpose to remove quickly the plate out of the path of the table, after liquid paste has been laid on the sheet laid on the table.

8. In a book fastening machine the combination of a movable table for the sheet to be fastened, a trough for receiving liquid paste, a movable plate, means for moving the plate in the path of the table, two bars fixed on the trough and having inclined surfaces, a spring plate fixed on each of the bars, rollers mounted at the sides of said plate, the arrangement being such that when the plate is removed from the path of the table said rollers run over the inclined surfaces of the bars, and when it is moved in the path of the table, the rollers run under the flat springs for the purpose of avoiding noise.

9. In a book fastening machine the combination of a trough for receiving liquid paste, a roller lodged in opposite sides of the trough, a movable plate having stickers, levers mounted pivotally on the trough, and lying with their free ends on the plate, an arm fixed on the same shaft as the levers, a treadle being under the action of a spring, and a rope connecting the arm with the treadle, the arrangement being such that when the treadle is pressed down, the plate is moved in the position in which the stickers can take up paste from the roller whereas when the treadle is released, the plate is moved in a position in which the stickers cannot take up paste from the roller.

10. In a book fastening machine the combination of a movable table for the sheet to be fastened, a trough for receiving liquid paste, a movable plate having stickers, means for removing the plate out of the path of the table a shaft mounted in bearings of the trough, two levers fixed on the said shaft and supporting a shaft, two arms mounted on this shaft, a bar fixed on these arms and serving to retain the sheet on the table when the plate is removed out of the path of the table, and means for raising and lowering said bar together with the plate.

11. In a book fastening machine the combination of a movable table for the sheet to be fastened, a trough for receiving liquid paste, a shaft mounted in the bearings of the trough, two levers fixed on said shaft and supporting (74), two arms (75, 76) mounted on this shaft, a bar (77) fixed on these arms and serving to retain the sheet on the table, an arm (78) fixed on said shaft (74), another arm (79) fixed on a shaft lodged in the frame for removing the fastened sheets from the table, this other arm (79) extending temporarily in the path of the arm (78), the arrangement being such, that when the arm (79) is raising it strikes against the arm (78) and turns the bar (77) out of the path of the table.

In testimony whereof I have affixed my signature in presence of two witnesses.

ULRICH BISCHOF

Witnesses:
HERMANN HUBER,
F. HEIM.